United States Patent
Hu et al.

(10) Patent No.: US 11,824,409 B2
(45) Date of Patent: Nov. 21, 2023

(54) DIRECT STARTING SYNCHRONOUS RELUCTANCE MOTOR ROTOR, MOTOR AND ROTOR MANUFACTURING METHOD

(71) Applicant: GREE ELECTRIC APPLIANCES, INC. OF ZHUHAI, Zhuhai (CN)

(72) Inventors: Yusheng Hu, Zhuhai (CN); Bin Chen, Zhuhai (CN); Jinfei Shi, Zhuhai (CN); Yong Xiao, Zhuhai (CN); Xia Li, Zhuhai (CN); Qinhong Yu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 91 days.

(21) Appl. No.: 17/604,126

(22) PCT Filed: Dec. 27, 2019

(86) PCT No.: PCT/CN2019/129420
§ 371 (c)(1),
(2) Date: Oct. 15, 2021

(87) PCT Pub. No.: WO2020/253203
PCT Pub. Date: Dec. 24, 2020

(65) Prior Publication Data
US 2022/0224210 A1     Jul. 14, 2022

(30) Foreign Application Priority Data

Jun. 19, 2019 (CN) .......................... 201910533863.8

(51) Int. Cl.
*H02K 1/27*      (2022.01)
*H02K 19/14*     (2006.01)
*H02K 15/00*     (2006.01)

(52) U.S. Cl.
CPC ......... *H02K 19/14* (2013.01); *H02K 15/0012* (2013.01)

(58) Field of Classification Search
CPC .... H02K 19/14; H02K 15/0012; H02K 1/265; H02K 1/246; H02K 19/103; H02K 21/44;
(Continued)

(56) References Cited

U.S. PATENT DOCUMENTS 2,975,310 A    3/1961   Armstrong et al.
10,686,343 B2 *   6/2020   Ikäheimo ................. H02K 1/28
(Continued)

FOREIGN PATENT DOCUMENTS

CN     204615530 U    9/2015
CN     106537740 A    3/2017
(Continued)

OTHER PUBLICATIONS

International Search Report and Written Opinion of the International Searching Authority dated Mar. 26, 2020 in PCT/CN2019/129420 (with English translation of the International Search Report only), 17 pages.
(Continued)

*Primary Examiner* — Leda T Pham
(74) *Attorney, Agent, or Firm* — Oblon, McClelland, Maier & Neustadt, L.L.P.

(57) ABSTRACT

The present disclosure provides a direct starting synchronous reluctance motor rotor, a motor and a rotor manufacturing method. The direct starting synchronous reluctance motor rotor comprises: a rotor core provided with a plurality of slit grooves, two ends of each of the slit grooves being provided with a filling groove respectively to form a magnetic barrier layer, a first end of the filling groove being disposed adjacent to the slit groove, a second end of the filling groove being extended towards an outside of the rotor
(Continued)

core, and an outer peripheral surface of the rotor core being provided with a notch communicated with the second end of the filling groove. By disposing notches and bevels at the end of the filling grooves, a reluctance torque of the motor can be increased, and then torque ripples generated by rotor and stator slots can be weakened mutually, thereby achieving the purpose of reducing the torque ripple of the motor and vibration noise of the motor, while improving an efficiency of the motor with the rotor and a starting capability of the motor.

19 Claims, 7 Drawing Sheets

(58) Field of Classification Search
CPC ........ H02K 19/24; H02K 29/03; H02P 25/08; H02P 1/163
See application file for complete search history.

(56) References Cited

U.S. PATENT DOCUMENTS

| | | |
|---|---|---|
| 2017/0237307 A1 | 8/2017 | Gontermann et al. |
| 2018/0226848 A1* | 8/2018 | Kolehmainen ........ H02K 19/14 |
| 2021/0218298 A1 | 7/2021 | Hu et al. |

FOREIGN PATENT DOCUMENTS

| | | |
|---|---|---|
| CN | 108768015 A | 11/2018 |
| CN | 110112847 A | 8/2019 |
| CN | 110138117 A | 8/2019 |
| CN | 209805521 U | 12/2019 |
| DE | 10 2014 215 304 A1 | 2/2016 |
| KR | 10-0643902 B1 | 11/2006 |
| WO | WO-2018083639 A1 * | 5/2018 ............. H02K 1/246 |

OTHER PUBLICATIONS

Extended European Search Report dated Jul. 21, 2022, in corresponding European Patent Application No. 19933980.5, 10 pages.

* cited by examiner

DIRECT STARTING SYNCHRONOUS RELUCTANCE MOTOR ROTOR, MOTOR AND ROTOR MANUFACTURING METHOD

TECHNICAL FIELD

The present disclosure relates to a technical field of motor devices, and particularly to a direct starting synchronous reluctance motor rotor, a motor and a rotor manufacturing method. The present disclosure claims priority of a patent application filed to the China National Intellectual Property Administration on Jun. 19, 2019, with an application number of 201910533863.8 and an invention title of 'Direct Starting Synchronous Reluctance Motor Rotor, Motor and Rotor Manufacturing Method'.

BACKGROUND ART

A direct starting synchronous reluctance motor combines structural characteristics of an induction motor and a synchronous reluctance motor, thereby realizing a start by generating a torque through a squirrel cage induction, carrying out a constant-speed running by generating a reluctance torque through a rotor inductance gap, and achieving a start and running by directly introducing power. Compared with a direct starting permanent magnet motor, the direct starting synchronous reluctance motor has no rare earth permanent magnet material or demagnetization, with a low cost and a good reliability. Compared with an asynchronous motor, the direct starting synchronous reluctance motor has a high efficiency and a constant speed. When the direct starting synchronous reluctance motor can be self-started, a controller is not required for start, and the cost is further reduced.

The traditional synchronous reluctance motor needs a driver for a start and running control, so the cost is high and the control is difficult. In addition, the driver causes a certain loss, and decreases the efficiency of the whole motor system. In the existing art, a patent CN106537740A provides a rotor, a reluctance machine and a method for manufacturing the rotor, wherein a filling material of a flux barrier of the rotor reaches a rotor periphery and forms a part of the rotor periphery; and machining is required after the material is filled in the flux barrier, which leads to a long manufacturing time, a low efficiency and a high manufacturing cost. Moreover, the motor has large torque ripple and much vibration noise. A patent CN105122613A provides a rotor. However, since some long arc-shaped flux barriers in an outer rotor region are all filled with aluminum or aluminum alloy, the starting capability of the machine is poor, or the flux barriers in the outer rotor region and a web design makes an inductance difference between a d-axis and a q-axis of the motor not maximized, while a rotor manufacturing method is also difficult. In the existing art, a patent CN1255925C provides a synchronous inductance motor in a low price, which can start easily, and a manufacturing apparatus and a manufacturing method for the synchronous inductance motor, wherein the rotor is provided with slit portions in a q-axis which is an easy-to-pass direction of the flux and a d-axis which is a difficult-to-pass direction of the flux, and a plurality of slot portions arranged at an outer periphery side of the slit portions, and wherein the slit portions and the slot portions are filled with conductivity materials; the slit portions are formed in a linear shape, and the slot portions are arranged radially at equal intervals in a circumferential direction. However, in this patent, since the slot portions are arranged radially at equal intervals, the flux between the slot portions flows radially perpendicular to a rotor surface, and the slot portions block the flow of the flux in a direction of the q-axis, so that a salient pole ratio is not large, and the output and efficiency of the motor are not enough.

SUMMARY

A main objective of the present disclosure is to provide a direct starting synchronous reluctance motor rotor, a motor and a rotor manufacturing method, to solve the problem of low efficiency of a motor in the prior art, thereby improving a starting capability of the motor and reducing a torque ripple of the motor.

In order to achieve the above objective, according to an aspect of the present disclosure, there is provided a direct starting synchronous reluctance motor rotor, comprising:
a rotor core provided with a plurality of slit grooves, two filling grooves respectively disposed adjacent to two ends of each of the slit grooves so as to form a magnetic barrier layer, a first end of the filling groove being disposed adjacent to the slit groove, a second end of the filling groove being extended towards an outside of the rotor core, and an outer peripheral surface of the rotor core being provided with a notch communicated with the second end of the filling groove.

Further, the notch is disposed at the second end of the filling groove and on a side adjacent to a d-axis.

Further, a width of the notch is L, which is less than a width of the second end of the filling groove, and $0.5\sigma \leq L \leq 4\sigma$, wherein $\sigma$ is an air gap width between a stator core and the rotor core.

Further, the width of the notch satisfies $1.5\sigma \leq L \leq 3\sigma$.

Further, a beveled edge is disposed on the second end of the filling groove away from a d-axis of the rotor core, and one end of the beveled edge adjacent to an peripheral surface of the rotor core is extended to the notch.

Further, $0.1W \leq L \leq 0.7W$, wherein W is a width of the second end of the filling groove.

Further, an included angle $\theta$ is between the beveled edge and a sidewall of the filling groove away from the side in the d-axis, wherein $125° \leq \theta \leq 165°$.

Further, an extending direction of the filling groove is parallel with or at an included angle with a d-axis of the rotor core.

Further, lengths of the filling grooves are gradually increased towards a d-axis of the rotor core.

Further, the slit groove and the filling groove have shapes of rectangles, circular arcs, or combinations of multiple shapes.

Further, there is an interval between the filling groove in a q-axis of the rotor core and an outer peripheral surface of the rotor core.

Further, at different poles of the rotor core, the adjacent slit grooves are symmetrically disposed along a d-axis of the rotor core on a rotor circumference, and the filling grooves are disposed symmetrically along the d-axis or a q-axis.

Further, there are at least two of the magnetic barrier layers formed by the slit grooves and the filling grooves at both ends thereof in the radial direction of the rotor core.

Further, a ratio of a sum of a total width of all of the slit grooves in a q-axis and a width of the filling groove in the q-axis to an effective core width in the radial direction of the rotor core is Q1, wherein $0.35 \leq Q1 \leq 0.5$.

Further, a part of the slit grooves and a part of the filling grooves are filled with a conductive magnetic-insulation material, or all of the filling grooves are filled with the conductive magnetic-insulation material.

Further, a ratio of a filling area of the conductive magnetic-insulation material to a total area of all of the filling grooves and the slit grooves is Q2, wherein $0.3 \leq Q2 \leq 0.7$.

Further, two ends of the rotor core further comprise conductive end rings, which communicate filling materials in all of the filling grooves to form a squirrel cage.

Further, a material of the conductive end ring is the same as that in the filling groove.

Further, at least a part of the slit grooves are air grooves penetrating in an axial direction of a rotor.

Further, widths of the slit grooves are gradually decreased outward in the radial direction of the rotor core.

Further, widths of magnetic conduction channels formed between adjacent two of the slit grooves are gradually decreased outward in the radial direction of the rotor core.

Further, a reinforcing rib is disposed between the filling groove and the slit groove in a same magnetic barrier layer, and a width of the reinforcing rib is L1, wherein $0.8\sigma \leq L1 \leq 3\sigma$.

According to another aspect of the present disclosure, there is provided a motor, comprising the direct starting synchronous reluctance motor rotor aforementioned.

According to still another aspect of the present disclosure, there is provided a rotor manufacturing method to manufacture the direct starting synchronous reluctance motor rotor aforementioned, the method comprising: producing a rotor core, and disposing closed filling grooves on the rotor core, so that the filling grooves have temporary ribs adjacent to an peripheral surface of the rotor core; filling a material into the filling grooves, and disposing conductive end rings at ends of the rotor core to form a squirrel cage; and removing the temporary ribs by turning to form notches of the filling grooves.

According to the technical solutions of the present disclosure, by disposing notches at the ends of the filling grooves, torque ripples generated by rotor and stator slots can be weakened mutually, thereby achieving the purpose of reducing the torque ripple of the motor and vibration noise of the motor, while improving an efficiency of the motor with the rotor.

BRIEF DESCRIPTION OF THE ACCOMPANYING DRAWINGS

The drawings of the specification, which constitute a part of the present disclosure, are used to provide a further understanding of the present disclosure. The illustrative embodiments and the descriptions thereof are used to explain the present disclosure, rather than constituting improper limitations thereto. In which.

In which, the above drawings include the following reference numerals:

10: rotor core;
20: slit groove;
30: filling groove;
31: notch
32: beveled edge;
40: reinforcing rib;
50: conductive end ring.

DETAILED DESCRIPTION OF THE PREFERRED EMBODIMENTS

It should be noted that the embodiments of the present disclosure and the features in the embodiments may be combined with each other if there is no conflict. The present disclosure will be described in detail as follows with reference to the drawings and in conjunction with the embodiments.

It should be noted that the terms used here are only for describing the specific embodiments, and are not intended to limit the exemplary embodiments according to the present disclosure. As used here, unless otherwise specified explicitly in the context, a singular form is also intended to include a plural form. In addition, it should be understood that when a term 'comprise' and/or 'include' is used in this specification, it indicates the presence of features, steps, operations, devices, components and/or combinations thereof.

It should be noted that the terms 'first', 'second', etc. in the Description, claims and drawings of the present disclosure are used to distinguish similar objects, rather than necessarily describing a specific order or sequence. It should be understood that the terms so used are interchangeable under appropriate circumstances, so that the embodiments of the present disclosure described here can be embodied, for example, in an order other than those illustrated or described here. In addition, the terms 'include' and 'have' and any variations thereof are intended to cover non-exclusive inclusions. For example, for a process, method, system, product or device including a series of steps or units, it is unnecessary to explicitly list those steps or units, and other steps or units not explicitly listed or inherent to the process, method, product or device may also be included.

For the convenience of description, spatial relative terms, such as 'on', 'above', 'on an upper surface of', 'over', etc., may be used to describe a spatial positional relationship between one device or feature and any other device or feature as illustrated in the drawings. It should be understood that spatial relative terms are intended to encompass different orientations in use or operation in addition to those of a device depicted in the drawings. For example, if a device in the drawings are inverted, the device described as being 'above other device or construction' or 'on other device or construction' will be positioned as being 'below other device or construction' or 'under other device or construction'. Therefore, the exemplary term 'above' may include two orientations, i.e., 'above' and 'below'. The device may also be positioned in other different ways (being rotated 90 for degrees or in other orientations), and the spatial relative description used here will be explained accordingly.

Now, the exemplary embodiments according to the present disclosure will be described more detailedly with reference to the drawings. However, these exemplary embodiments may be embodied in many different forms, and should not be interpreted as being limited to the embodiments set forth here. It should be understood that these embodiments are provided in order to make the content of the present disclosure thorough and complete, and fully convey the concepts of these exemplary embodiments to those of ordinary skill in the art. In the drawings, it is possible to enlarge the thicknesses of layers and areas for clarity, and the same reference numerals are used to denote the same devices, so the descriptions thereof will be omitted.

Referring to FIGS. 1 to 8, an embodiment according to the present disclosure provides a direct starting synchronous reluctance motor rotor.

Figure 1:
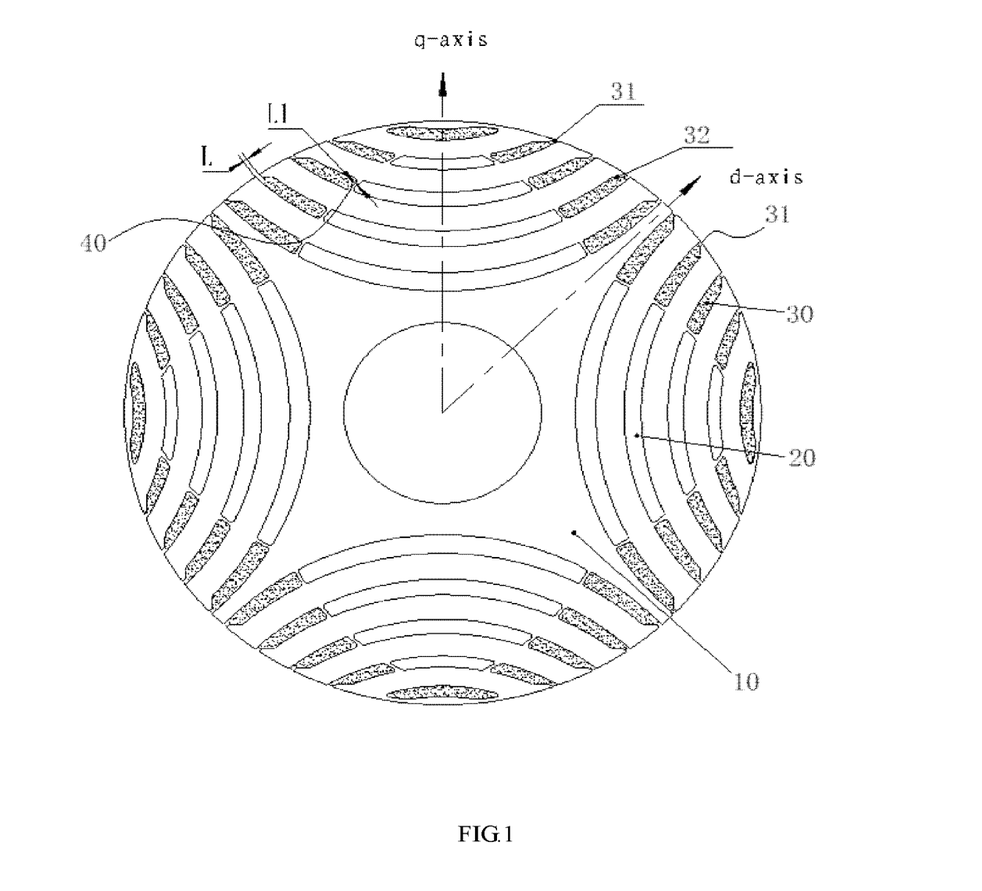
FIG. 1 illustrates a structural diagram of a first embodiment of a direct starting synchronous reluctance motor rotor according to the present disclosure.

Specifically, as illustrated in FIG. 1, the rotor comprises a rotor core 10 provided with a plurality of slit grooves 20. Two ends of each of the slit grooves 20 are provided with a filling groove 30 respectively to form a magnetic barrier layer. A first end of the filling groove 30 is disposed adjacent to the slit groove 20. A second end of the filling groove 30 is extended towards an outside of the rotor core 10, and an outer peripheral surface of the rotor core 10 is provided with a notch 31 communicated with the second end of the filling groove 30. The notch 31 is provided at the second end of the filling groove 30 adjacent to a d-axis. In this embodiment, by disposing the notch at the end of the filling groove, a q-axis reluctance of the motor can be increased, a magnetic leakage can be reduced, a reluctance torque of the motor can be increased, and an efficiency of the motor with the rotor can be improved.

Figure 2:
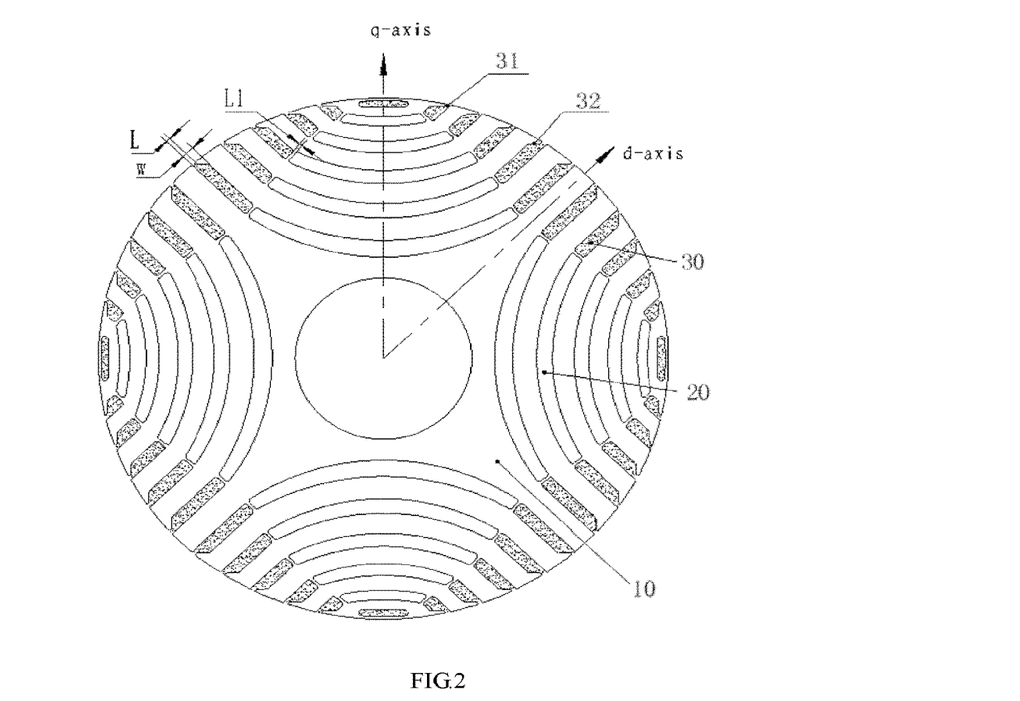
FIG. 2 illustrates a structural diagram of a second embodiment of a direct starting synchronous reluctance motor rotor according to the present disclosure.

In which, as illustrated in FIGS. 1 and 2, a width of the notch 31 is L, which is less than a width of the second end of the filling groove 30, and $0.5\sigma \leq L \leq 4\sigma$, wherein $\sigma$ is an air gap width between a stator core and the rotor core 10. Preferably, the width of the notch 31 satisfies $1.5\sigma \leq L \leq 3\sigma$. This arrangement of the notch can effectively increase the q-axis reluctance, reduce the q-axis flux, reduce the q-axis inductance and improve the motor torque.

As illustrated in FIGS. 1 and 2, a beveled edge 32 is disposed on the second end of the filling groove 30 away from a side in a d-axis of the rotor core 10. One end of the beveled edge 32 adjacent to an peripheral surface of the rotor core 10 is extended to the notch 31. The beveled edge can ensure that the d-axis flux enters stator teeth, while reducing a flux ripple and a torque ripple of the motor.

Preferably, $0.1W \leq L \leq 0.7W$, wherein W is a width of the second end of the filling groove 30. An included angle $\theta$ is between the beveled edge 32 and the sidewall of the filling groove 30 away from the side in the d-axis, wherein $125° \leq \theta \leq 165°$. An extending direction of the filling groove 30 is parallel with the d-axis of the rotor core 10, or the extending direction of the filling groove 30 has a small included angle with the d-axis and extends along the d-axis, and lengths of the filling grooves 30 are gradually increased towards the d-axis of the rotor core 10. widths of the slit grooves 20 are gradually decreased outward in the radial direction of the rotor core 10. Widths of magnetic conduction channels formed between adjacent two of the slit grooves 20 are gradually decreased outward in the radial direction of the rotor core 10. A reinforcing rib 40 is disposed between the filling groove 30 and the slit groove 20 in a same magnetic barrier layer, and a width of the reinforcing rib 40 is L1, wherein $0.8\sigma \leq L1 \leq 3\sigma$. An appropriate trimming can reduce the torque ripple generated by the rotor and stator slots, and achieve the purpose of reducing the torque ripple of the motor and the vibration noise of the motor. The filling groove is disposed to increase the efficiency of the motor with the rotor while improving the starting capability of the motor. The reinforcing rib with an appropriate width can increase the structural strength of the rotor while ensuring a very small magnetic leakage.

Further, the shapes of the slit groove 20 and the filling groove 30 are not limited, and may be rectangles, circular arcs, combinations of multiple shapes, etc. There is an interval between the filling groove 30 in the q-axis of an outer peripheral surface of the rotor core 10 and an outer peripheral surface of the rotor core 10, that is, there is no notch in the filling groove 30 in the q-axis of the outer periphery of the rotor core 10. At different poles, the adjacent slit grooves 20 are symmetrically disposed along the d-axis on a rotor circumference. The filling grooves 30 are disposed symmetrically along the d-axis or the q-axis. There are at least two of the magnetic barrier layers formed by the slit grooves 20 and the filling grooves 30 at both ends thereof in the radial direction of the rotor core 10. A ratio of a sum of a total width of all of the slit grooves 20 in the q-axis and a width of the filling groove 30 in the q-axis to an effective core width in the radial direction of the rotor core 10 is Q1, wherein $0.35 \leq Q1 \leq 0.5$. Thus, a sufficient utilization of the motor rotor is ensured, and the stability of the rotor and the efficiency of the motor are improved. The multiple layers of magnetic barriers produce a greater reluctance torque. In which, the effective core width is a width from an inner circle to an outer circle of the rotor core.

A part of the slit grooves 20 and a part of the filling grooves 30 are filled with a conductive magnetic-insulation material, or all of the filling grooves 30 are filled with the conductive magnetic-insulation material, preferably, aluminum or aluminum alloy. A ratio of a filling area of the conductive magnetic-insulation material to a total area of all of the filling grooves 30 and the slit grooves 20 is Q2, wherein $0.3 \leq Q2 \leq 0.7$, and preferably, the ratio is 0.4 to 0.6, which effectively improves the starting capability of the motor. Two ends of the rotor core 10 further comprise conductive end rings 50, which communicate the filling materials in all of the filling grooves 30 to form a squirrel cage. The material of the conductive end ring 50 is the same as that in the filling groove 30. At least a part of the slit grooves 20 are air grooves penetrating in an axial direction of the rotor. The squirrel cage can help the start of the motor without a controller. The air slit groove can promote an air circulation inside the rotor, increase a heat dissipation capacity, reduce a temperature rise of the rotor and improve a reliability of the motor.

The rotor in the above embodiments may also be applied in the technical field of motor devices, i.e., according to another aspect of the present disclosure, there is provided a motor comprising the direct starting synchronous reluctance motor rotor described in the above embodiments.

According to still another aspect of the present disclosure, there is provided a rotor manufacturing method for manufacturing the direct starting synchronous reluctance motor rotor aforementioned. The method comprises the steps of: producing a rotor core, and disposing closed filling grooves on the rotor core, so that the filling grooves have temporary ribs adjacent to an peripheral surface of the rotor core; filling a material into the filling grooves, and disposing conductive end rings at ends of the rotor core to form a squirrel cage; removing the temporary ribs by turning to form notches of the filling grooves.

Specifically, the present disclosure provides a direct starting synchronous reluctance motor rotor, which generates a reluctance torque through a inductance difference between a d-axis and a q-axis of a rotor, realizes efficient and constant-speed running, and solves the problem of low efficiency of an asynchronous motor, while achieving the purpose of reducing a torque ripple of the motor, and then reducing vibration noise of the motor. As illustrated in FIG. 1, the rotor is composed of a rotor core formed by overlying rotor laminations of specific structures and conductive end rings 50 at both ends of the rotor core, wherein each of the rotor laminations is provided with a plurality of slit grooves, filling grooves, and shaft holes matched with a rotating shaft. The slit grooves and the corresponding filling grooves are combined to form magnetic barrier layers among which flux channels are formed. A semi-open structure having a thin notch is disposed at the end of the filling groove (adjacent to) the outer periphery of the rotor. The notch is disposed at the end of the filling groove adjacent to a side of the d-axis, while an end of the filling groove away from the d-axis is provided with a beveled edge, which is connected to a side of the notch to form a semi-open groove.

By disposing the beveled edge, the flux channel between the outer periphery of the rotor and the filling groove is widened, and a d-axis flux can smoothly enter the stator by chamfering, thereby reducing the influence of the notches on the d-axis flux and ensuring a d-axis inductance. Meanwhile, the chamfering can also improve a flux distribution, slow down a flux change, reduce a torque ripple caused by an interaction with stator slot, and reduce the vibration noise of the motor.

By disposing the notches, it can effectively block the flow of the q-axis flux, reduce the q-axis inductance, increase the inductance difference between the d-axis and the q-axis of motor, and improve the output torque and efficiency.

Figure 7:
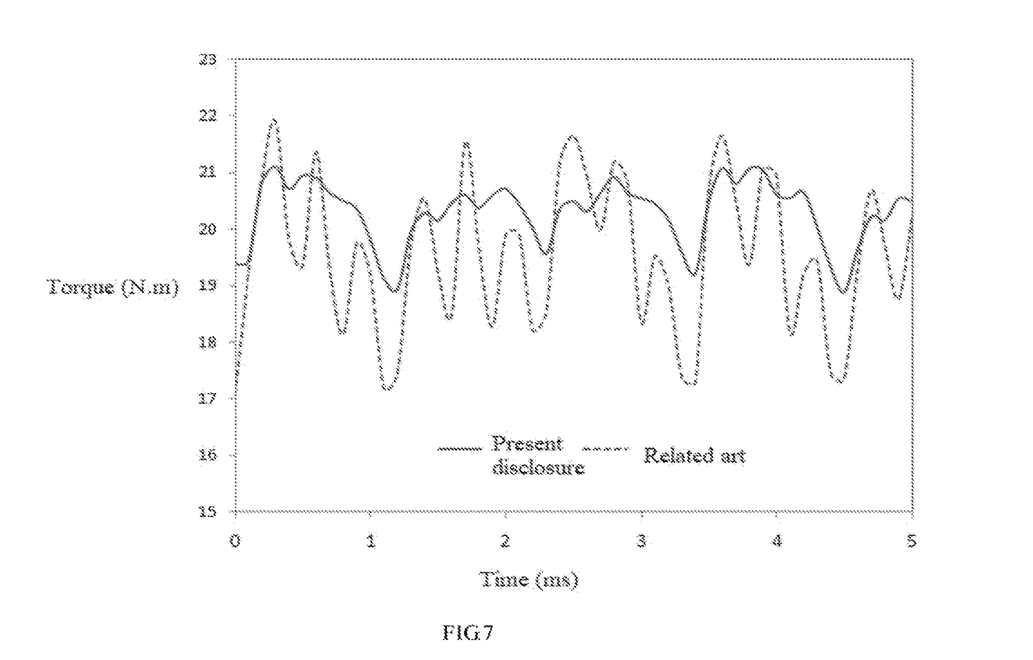
FIG. 7 illustrates a comparison diagram of motor torque curves according to the present disclosure and in the existing art.

FIG. 7 illustrates a comparison diagram of motor torque curves in the technology of the present disclosure and in the existing art. The technology of the present disclosure reduces the torque ripple of the motor by more than half, improves an average torque, and reduces vibration noise caused by the torque ripple, while increasing the motor torque and improving the motor efficiency.

Further, a width of the notch of the filling groove is L, which satisfies $0.5\sigma \leq L \leq 4\sigma$, and $\sigma$ is an air gap width between a stator inner diameter and a rotor outer diameter. Preferably, the width L of the notch of the filling groove satisfies $1.5\sigma \leq L \leq 3\sigma$. A width of the filling groove adjacent to the outer periphery of the rotor is W, and the width L of the notch is less than W. Preferably, $0.1W \leq L \leq 0.7W$, and an optimal inductance difference can be obtained by selecting an appropriate width of the notch. An angle $\theta$ is between the beveled edge and the side of the corresponding filling groove. Preferably, $125° \leq \theta \leq 165°$. The beveled edge can reduce the influence of the opening of the filling groove on the d-axis inductance, so that the d-axis inductance can smoothly enter the stator to generate a torque. Moreover, the beveling can reduce the sudden change of the inductance and the reluctance torque ripple.

The extending direction of the filling groove at either end of the slit groove of the rotor is parallel with or at an included angle with the d-axis, wherein the included angle is small, so that the extending direction of the filling groove is approximately parallel with the d-axis and the d-axis flux flows smoothly along the d-axis. As the filling groove becomes closer to the corresponding d-axis, an extending length along the d-axis and the area of the filling groove increase. On the contrary, as the filling groove is farther from the corresponding d-axis, the extending length along the d-axis and the area of the filling groove decrease. The deep and narrow filling grooves have a skin effect, and the unequal filling grooves increase a pull-in torque in the starting process, which is helpful to improve the starting performance of the motor.

widths of the slit grooves are L2, which are gradually decreased in a direction away from a center of the rotor core. Widths of the magnetic channel formed between adjacent two of the slit grooves are L3, which are gradually decreased in the direction away from the center of the rotor core. The magnetic channel adjacent to a rotor center has a strong magnetic field strength, and the magnetic channel is designed to be wide to avoid the influence of magnetic field saturation on the output and efficiency of the motor.

Figure 6:
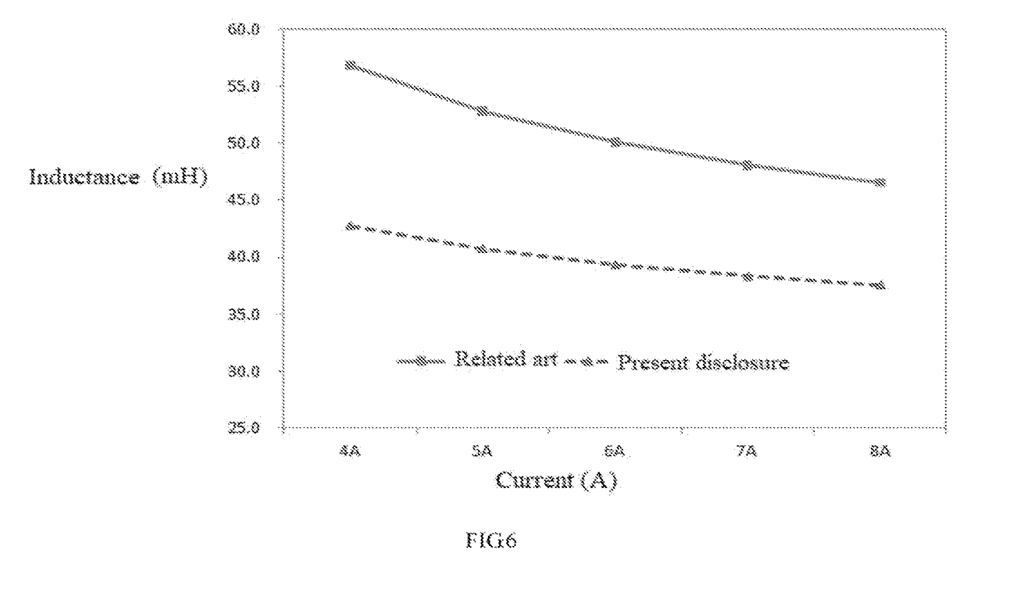
FIG. 6 illustrates a comparison diagram of motor q-axis inductances according to the present disclosure and in the existing art.
Figure 8:
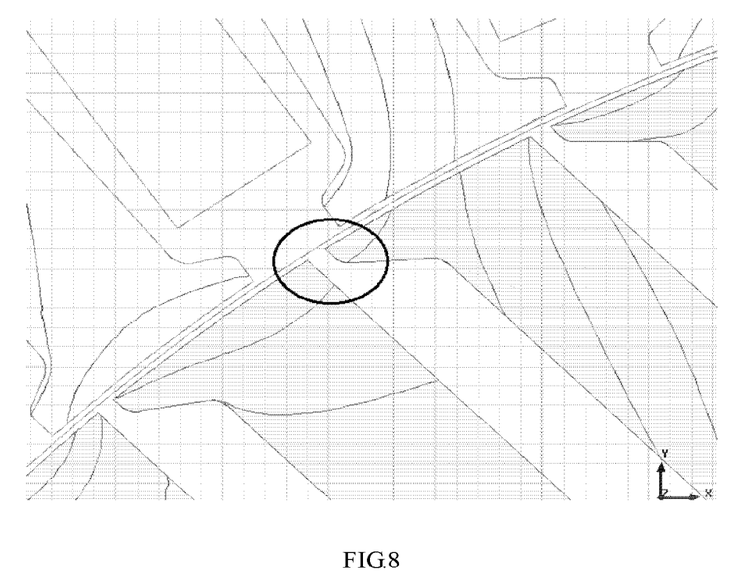
FIG. 8 illustrates a schematic diagram of a magnetic circuit at a notch of a direct starting synchronous reluctance motor rotor according to the present disclosure.
Figure 9:
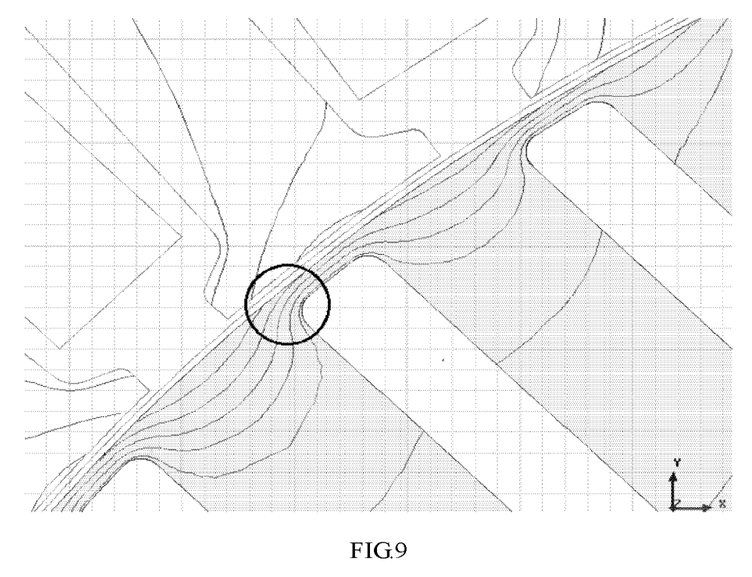
FIG. 9 illustrates a schematic diagram of a magnetic circuit without a notch in the existing art.

In FIG. 9, more q-axis flux passes between the end of the filling groove and an outer circle of the rotor in the existing art, while in FIG. 8, the notch in the technical solution of the present disclosure effectively blocks the q-axis flux, without affecting the d-axis flux from entering the stator. FIG. 6 illustrates a comparison diagram of motor q-axis inductances in the technology of the present disclosure and in the existing art, and the q-axis inductance in the technology of the present disclosure is greatly reduced with an obvious effect.

Figure 10:
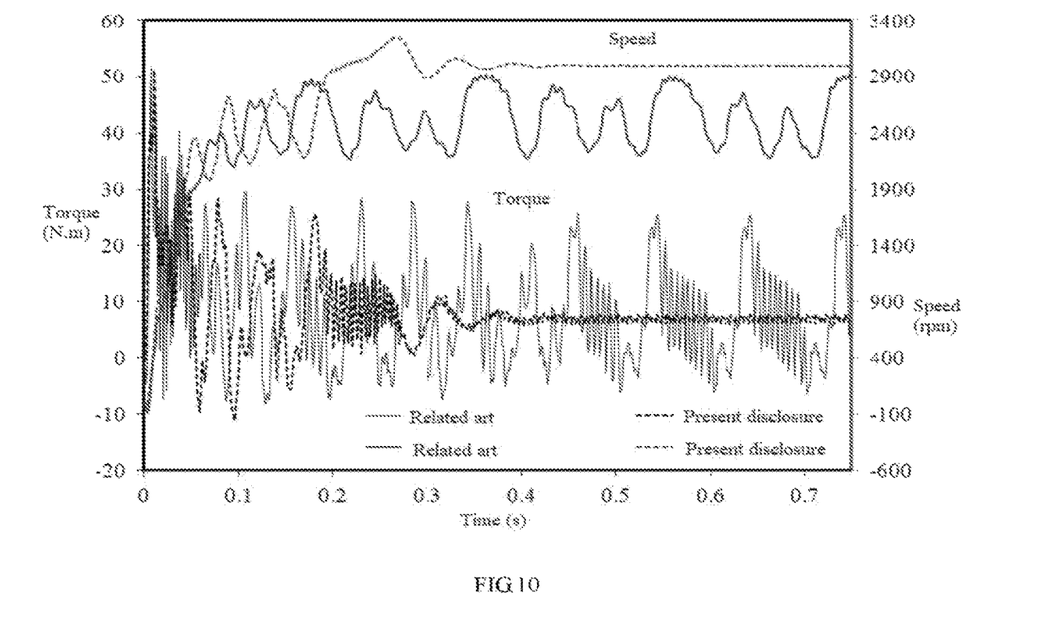
FIG. 10 illustrates a comparison diagram of speed curves of motor starting processes in the existing art and according to the present disclosure.

FIG. 10 illustrates a comparison diagram of speed curves of motor starting processes in the existing art and in the technology of the present disclosure. Under a given large load, the motor in the technology of the present disclosure can start and run synchronously and stably, while in the existing art, the torque and speed oscillation cannot be synchronized, so the technology of the present disclosure has a stronger starting capability.

Figure 11:
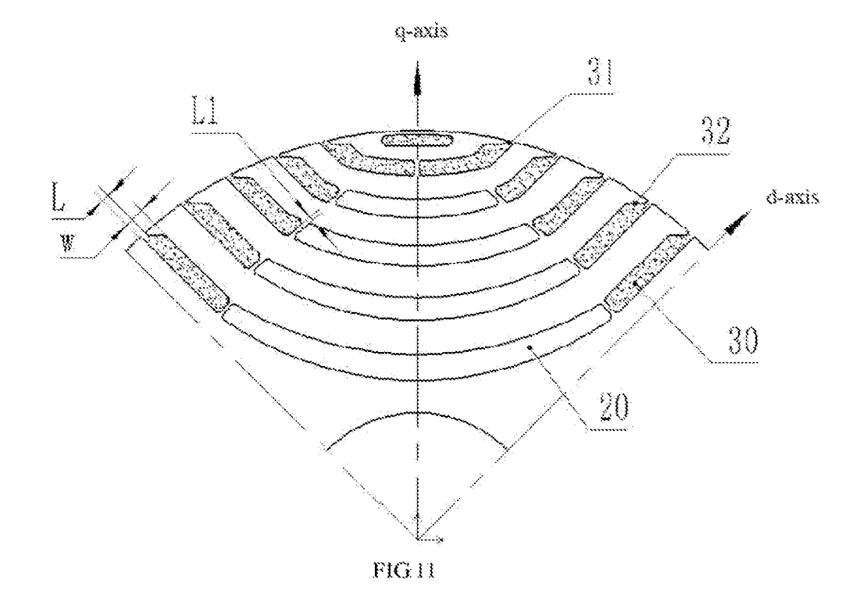
FIG. 11 illustrates a structural diagram of a fifth embodiment of a direct starting synchronous reluctance motor rotor according to the present disclosure.

FIG. 11 illustrates a structural diagram of a fifth embodiment of a direct starting synchronous reluctance motor rotor according to the present disclosure, wherein the outermost slit grooves are completely filled with a conductive magnetic-insulation material, and the filling grooves are further extended inward to increase the filling area, thereby further improving the starting capability of the motor.

Figure 12:
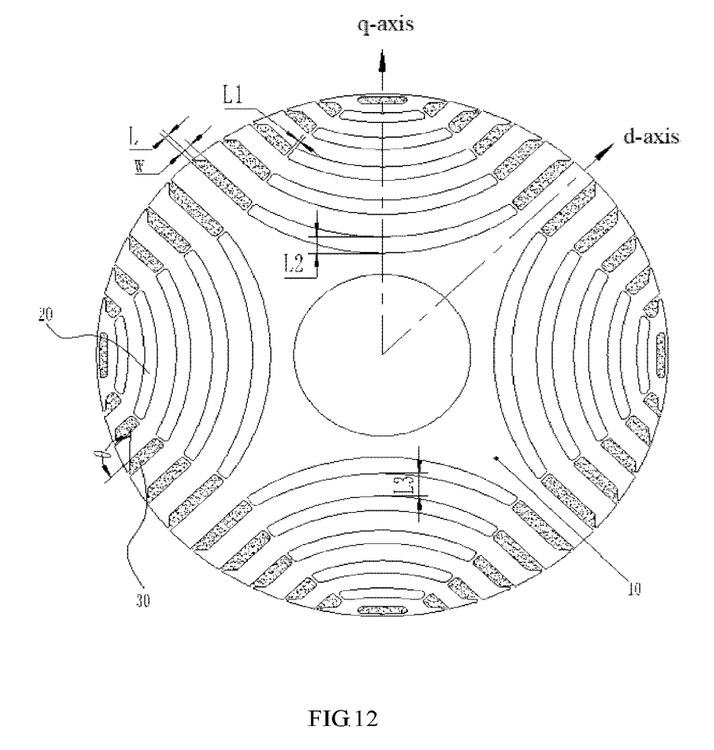
FIG. 12 illustrates a structural diagram of a sixth embodiment of a direct starting synchronous reluctance motor rotor according to the present disclosure.

As illustrated in FIG. 12, L1 is a distance between the filling groove and the slit groove, and L2 is a width of the slit groove. L3 is a distance between adjacent two of the slit grooves.

Figure 3:
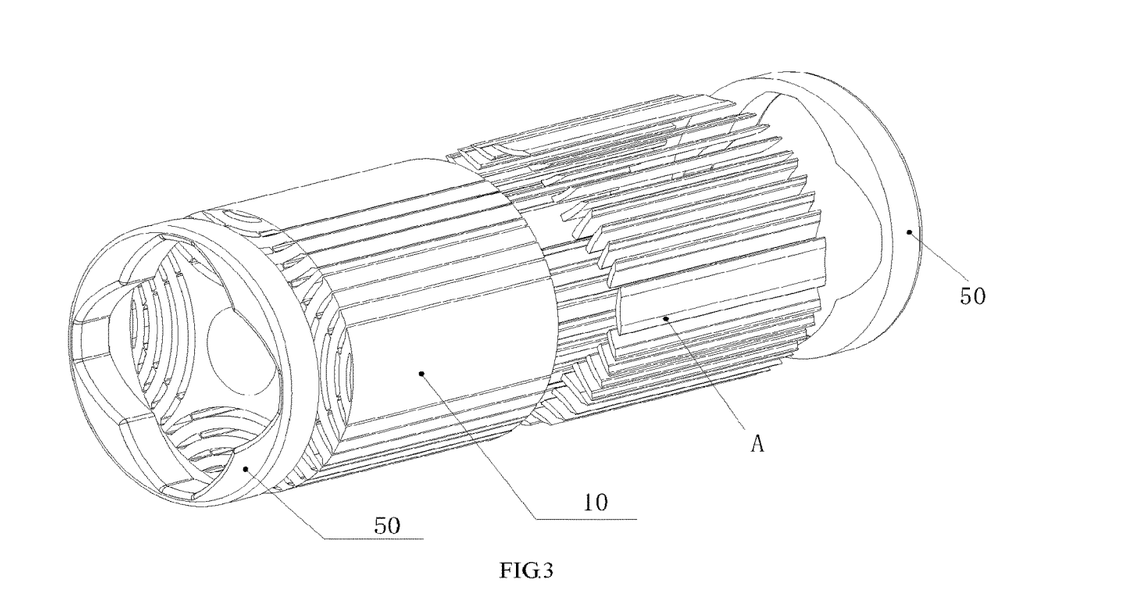
FIG. 3 illustrates a structural diagram of a third embodiment of a direct starting synchronous reluctance motor rotor according to the present disclosure.
Figure 4:
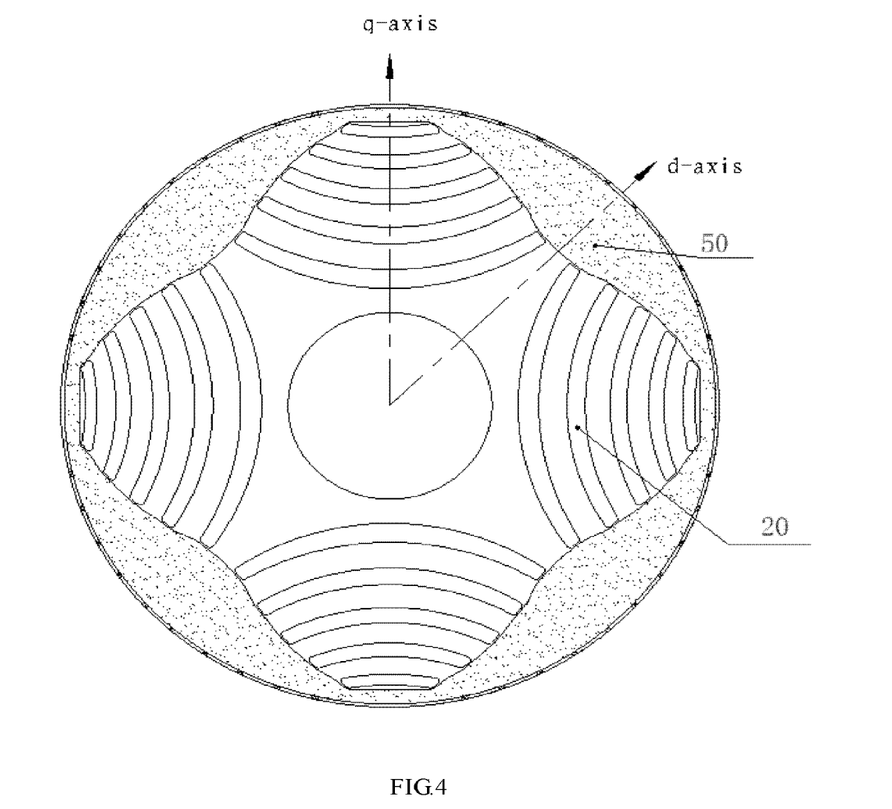
FIG. 4 illustrates a structural diagram of a fourth embodiment of a direct starting synchronous reluctance motor rotor according to the present disclosure.

A width of the rib between the filling groove and the slit groove is L1, which satisfies $0.8\sigma \leq L1 \leq 3\sigma$, and $\sigma$ is a width of an air gap between a stator inner diameter and a rotor outer diameter. This arrangement ensures a sufficient mechanical strength while reducing the circulation of the q-axis flux. The filling grooves and the slit grooves are disposed in pairs on the rotor circumference, and there are at least two of the magnetic barrier layers formed by the filling grooves and the slit grooves in the radial direction of the rotor core, thus forming pairs of salient poles. All of the filling grooves are filled with a conductive magnetic-insulation material, preferably aluminum or aluminum alloy. All of the filling grooves are short-circuited by the conductive end rings at both ends of the rotor to form a squirrel cage, and the material of the conductive end ring is the same as that of the filling groove. As illustrated in FIG. 4, the conductive end ring can cover the filling groove and expose the slit groove. As illustrated in FIG. 3, the rotor of present disclosure is clearly expressed, and the rotor is composed of a rotor core formed by overlying rotor laminations of specific structures, conductive end rings and filling grooves filled with a conductive material. The filling material in the filling grooves and the conductive end rings form a squirrel cage, wherein A is a guide bar located in the filling groove.

Figure 5:
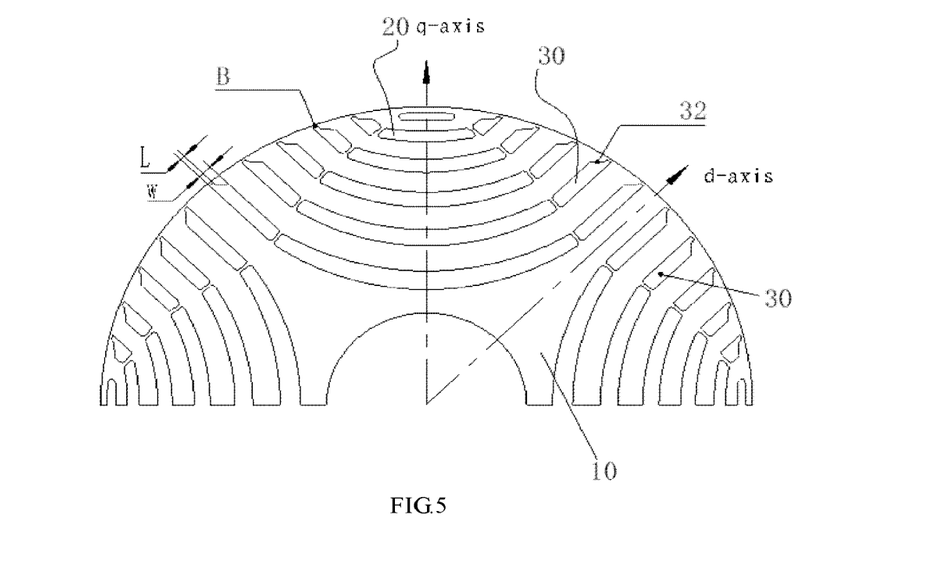
FIG. 5 illustrates a structural diagram of a direct starting synchronous reluctance motor rotor according to the present disclosure before turning.

The present disclosure further provides a method for manufacturing the rotor in the above embodiments. Firstly, a rotor core slightly larger than an outer periphery of a rotor is manufactured. At this time, the filling grooves are closed, and temporary ribs (see B in FIG. 5) separated from the outer periphery of the rotor are disposed at the notches of the filling grooves. Next, the filling grooves are filled with the filling material and form a squirrel cage together with the end rings. Finally, the temporary ribs are removed by turning to form a semi-open groove, thereby manufacturing the rotor. FIG. 5 illustrates a rotor before turning in the embodiments of present disclosure, wherein a temporary rib is disposed between the notch of each of the filling grooves and the outer periphery of the rotor, and the temporary ribs are removed by turning, so that the filling groove has an open groove to manufacture the rotor. In the present disclosure, the slit groove and the filling groove are not limited to straight side-shaped, and may be arc-shaped, without affecting the effect of the technical solution.

In addition, it should be further noted that 'one embodiment', 'another embodiment' and 'an embodiment' mentioned in this specification mean that the specific features, structures or characteristics described in conjunction with this embodiment are included in at least one embodiment generally described in the present disclosure. The same expression appearing in several places in the specification does not necessarily refer to a same embodiment. Further, when a specific feature, structure or characteristic is described in conjunction with any embodiment, it is claimed that the implementation of the feature, structure or characteristic in conjunction with any other embodiment should fall within the scope of the present disclosure.

The description of each embodiment has its own emphasis. For a portion that is not detailed in one embodiment, please refer to the relevant descriptions in other embodiments.

Those described above are just preferred embodiments of the present disclosure, rather than limitations thereto. For persons skilled in the art, various modifications and changes can be made to the present disclosure. Any modification, equivalent substitution, improvement, etc. made within the spirit and principle of the present disclosure should fall within the protection scope of the present disclosure.

The invention claimed is:

1. A direct starting synchronous reluctance motor rotor, comprising:
    a rotor core provided with a plurality of slit grooves; and
    two filling grooves respectively disposed adjacent to two ends of each of the slit grooves to form a magnetic barrier layer,
    wherein a first end of a filling groove being disposed adjacent to a slit groove, a second end of the filling groove being extended towards an outside of the rotor core, and an outer peripheral surface of the rotor core being provided with a notch communicated with the second end of the filling groove, and
    wherein a width of the notch is L, which is less than a width of the second end of the filling groove, and $0.5\sigma \leq L \leq 4\sigma$, wherein $\sigma$ is an air gap width between a stator core and the rotor core.

2. The direct starting synchronous reluctance motor rotor according to claim 1, wherein the notch is disposed at the second end of the filling groove adjacent to a d-axis.

3. The direct starting synchronous reluctance motor rotor according to claim 1, wherein the width of the notch satisfies $1.5\sigma \leq L \leq 3\sigma$.

4. The direct starting synchronous reluctance motor rotor according to claim 1, wherein a beveled edge is disposed on the second end of the filling groove away from a d-axis of the rotor core beveled edge, and one end of the beveled edge adjacent to the peripheral surface of the rotor core (10) is extended to the notch.

5. The direct starting synchronous reluctance motor rotor according to claim 1, wherein $0.1W \leq L \leq 0.7W$, wherein W is a width of the second end of the filling groove.

6. The direct starting synchronous reluctance motor rotor according to claim 4, wherein an included angle $\theta$ is between the beveled edge and a sidewall of the filling groove away from the side in the d-axis, wherein $125° \leq \theta \leq 165°$.

7. The direct starting synchronous reluctance motor rotor according to claim 1, wherein an extending direction of the filling groove is parallel with or at an included angle with a d-axis of the rotor core, and lengths of the filling grooves are gradually increased towards a d-axis of the rotor core.

8. The direct starting synchronous reluctance motor rotor according to claim 1, wherein the slit groove and the filling groove have shapes of rectangles, circular arcs, or combinations of multiple shapes.

9. The direct starting synchronous reluctance motor rotor according to claim 1, wherein there is an interval between the filling groove in a q-axis of the rotor core and an outer peripheral surface of the rotor core.

10. The direct starting synchronous reluctance motor rotor according to claim 1, wherein at different poles of the rotor core, the adjacent slit grooves are symmetrically disposed along a d-axis of the rotor core on a rotor circumference, and the filling grooves are disposed symmetrically along the d-axis or a q-axis, and there are at least two of the magnetic barrier layers formed by the slit groove and the filling grooves at both ends thereof in a radial direction of the rotor core.

11. The direct starting synchronous reluctance motor rotor according to claim 10, wherein a reinforcing rib is disposed between the filling groove and the slit groove in a same magnetic barrier layer, and a width of the reinforcing rib is L1, wherein $0.8\sigma \leq L1 \leq 3\sigma$.

12. The direct starting synchronous reluctance motor rotor according to claim 1, wherein a ratio of a sum of a total width of all of the slit grooves in a q-axis and a width of the filling groove in the q-axis to an effective core width in a radial direction of the rotor core is Q1, wherein $0.35 \leq Q1 \leq 0.5$.

13. The direct starting synchronous reluctance motor rotor according to claim 1, wherein a part of the slit grooves and a part of the filling grooves are filled with a conductive magnetic-insulation material, or all of the filling grooves are filled with the conductive magnetic-insulation material, and a ratio of a filling area of the conductive magnetic-insulation material to a total area of all of the filling grooves and the slit grooves is Q2, wherein $0.3 \leq Q2 \leq 0.7$.

14. The direct starting synchronous reluctance motor rotor according to claim 1, wherein two conductive end ring are disposed on two ends of the rotor core to communicate filling materials in all of the two filling grooves, such that a squirrel cage is formed, and a material of the conductive end ring is the same as that in the filling groove.

15. The direct starting synchronous reluctance motor rotor according to claim 1, wherein at least a part of the slit grooves are air grooves penetrating in an axial direction of a rotor.

16. The direct starting synchronous reluctance motor rotor according to claim 1, wherein widths of the slit grooves are gradually decreased outward in a radial direction of the rotor core.

17. The direct starting synchronous reluctance motor rotor according to claim 1, wherein widths of a magnetic conduction channels formed between adjacent two of the slit grooves are gradually decreased outward in a radial direction of the rotor core.

18. A motor, comprising the direct starting synchronous reluctance motor rotor according to claim 1.

19. A rotor manufacturing method to manufacture the direct starting synchronous reluctance motor rotor according to claim 1, the method comprising:
    producing a rotor core, and disposing closed filling grooves on the rotor core, so that the filling grooves have temporary ribs adjacent to an peripheral surface of the rotor core;
    filling a material into the filling grooves, and disposing conductive end rings at ends of the rotor core to form a squirrel cage; and
    removing the temporary ribs by turning to form notches of the filling grooves.

* * * * *